(12) United States Patent
Shimamoto et al.

(10) Patent No.: US 7,988,743 B2
(45) Date of Patent: Aug. 2, 2011

(54) METHOD FOR MANUFACTURING SOLID ELECTROLYTIC CAPACITOR

(75) Inventors: Yukari Shimamoto, Kyoto (JP); Yasunobu Tsuji, Osaka (JP); Ayumi Kochi, Osaka (JP); Seiji Takagi, Osaka (JP)

(73) Assignee: Panasonic Corporation, Osaka (JP)

( * ) Notice: Subject to any disclaimer, the term of this patent is extended or adjusted under 35 U.S.C. 154(b) by 251 days.

(21) Appl. No.: 12/510,772

(22) Filed: Jul. 28, 2009

(65) Prior Publication Data
US 2010/0024182 A1 Feb. 4, 2010

(30) Foreign Application Priority Data

Jul. 30, 2008 (JP) ................... 2008-196131

(51) Int. Cl.
*H01G 9/00* (2006.01)
(52) U.S. Cl. ..................................... 29/25.03
(58) Field of Classification Search ............ 29/25.03
See application file for complete search history.

(56) References Cited

U.S. PATENT DOCUMENTS 6,165,642 A * 12/2000 Kawakami et al. ......... 429/218.1
7,826,200 B2 * 11/2010 Pascenko ....................... 361/523

FOREIGN PATENT DOCUMENTS

| JP | 02-249222 A | 10/1990 |
| JP | 11-238648 A | 8/1999 |
| JP | 2001-110683 A | 4/2001 |

* cited by examiner

*Primary Examiner* — Alexander Ghyka
*Assistant Examiner* — Seahvosh Nikmanesh
(74) *Attorney, Agent, or Firm* — Pearne & Gordon LLP

(57) ABSTRACT

Disclosed is a method for manufacturing a solid electrolytic capacitor in which a capacitor element has conductive polymer solid electrolyte on a dielectric oxide film layer. The method includes the following processes: forming a manganese oxide layer on the dielectric oxide film layer; and chemically polymerizing a reaction solution containing a monomer, aromatic sulfonic acid, and a solvent using the manganese oxide layer as an oxidizing agent. Here, polyhydric alcohol capable of being coordinated to manganese ions released from the manganese oxide layer is made to coexist with the chemical polymerization reaction.

7 Claims, 3 Drawing Sheets

METHOD FOR MANUFACTURING SOLID ELECTROLYTIC CAPACITOR

BACKGROUND OF THE INVENTION

1. Field of the Invention

The present invention relates to a method for manufacturing a solid electrolytic capacitor with conductive polymer as a solid electrolyte.

2. Background Art

As electronic equipment is becoming increasingly sophisticated, solid electrolytic capacitors used in it are also being required to have high performance. It is now essential for solid electrolytic capacitors to reduce the equivalent series resistance (hereinafter, ESR) in a high frequency range, especially in the field of computers and digital home appliances. Therefore, various measures have been proposed to achieve solid electrolytic capacitors with low ESR and still high capacity to correspond to the increasing current of electronic equipment in recent years.

FIG. 5 is an enlarged sectional view of a capacitor element of a conventional solid electrolytic capacitor. The capacitor element includes anode body 42, dielectric oxide film layer 44 formed thereon, and solid electrolyte 46 further formed thereon.

Anode body 42, which is a porous body formed by either etching valve metal foil or sintering valve metal powder, has fine pores 43 having an average pore diameter of about 0.1 μm to 0.8 μm.

Dielectric oxide film layer 44 is formed in fine pores 43 of anode body 42 and on the surface of outer periphery 42A of anode body 42. Solid electrolyte 46 is formed of a highly conductive polymer such as polythiophene to reduce the ESR of the solid electrolytic capacitor.

One well-known method for forming solid electrolyte 46 of polythiophene on the surface of dielectric oxide film layer 44 is a chemical polymerization method. In the method, either a thiophene monomer or a thiophene derivative monomer is subjected to a redox reaction with an oxidizing agent. The oxidizing agent can be applied using one of two well-known approaches. One is to mix it with the monomer in a solution, and the other is to previously form it as a layer thereof on dielectric oxide film layer 44.

In the chemical polymerization by the former approach, the monomer and the oxidizing agent are mixed in a solution, which means that the chemical polymerization is performed in the solution. This causes a conductive polymer such as poly(3,4-ethylenedioxythiophene) (hereinafter, PEDT) to be generated and float in the mixed solution, thus reducing the amount of PEDT formed on dielectric oxide film layer 44, and hence, reducing the yield.

As another problem of the former approach, the chemical polymerization reaction on outer periphery 42A of anode body 42 proceeds very fast. As a result, the PEDT clogs openings 43A of fine pores 43 as shown in FIG. 5 and is not formed very uniformly inside fine pores 43. This results in a decrease in capacitance.

In the chemical polymerization by the latter approach, on the other hand, a reaction solution is prepared containing, for example, 3,4-ethylenedioxythiophene (hereinafter, EDT) as a monomer, benzenesulfonic acid, and methanol. Meanwhile, a manganese dioxide layer is previously formed as an oxidizing agent layer on dielectric oxide film layer 44. Then, a reaction solution is brought into contact with the manganese dioxide formed on dielectric oxide film layer 44. In this approach, however, the chemical polymerization reaction stops halfway, making it impossible to form the PEDT stably on dielectric oxide film layer 44.

SUMMARY OF THE INVENTION

The method for manufacturing a solid electrolytic capacitor according to the present invention includes the following three processes: A) forming a capacitor element, B) connecting an anode terminal to an anode section of an anode body in the capacitor element and a cathode terminal to a current collector layer of the capacitor element; and C) coating the capacitor element with outer resin in such a manner that the anode terminal and the cathode terminal are partially exposed from the outer resin. The step A includes the following three processes: A1) forming a manganese oxide layer on a surface of a dielectric oxide film layer in a cathode section of the anode body, which is divided into the anode section and the cathode section; A2) forming conductive polymer as solid electrolyte on the dielectric oxide film layer by chemically polymerizing a reaction solution containing a monomer, an aromatic sulfonic acid, and a solvent using the manganese oxide layer as an oxidizing agent; and A3) forming the current collector layer on the solid electrolyte. In the step A2, polyhydric alcohol capable of being coordinated to manganese ions released from the manganese oxide layer is made to coexist with the chemical polymerization reaction.

The polyhydric alcohol is thus made to coexist with the chemical polymerization reaction and to be coordinated to manganese ions from the manganese oxide layer, so that the manganese ions can be removed from the solid electrolyte. Forming solid electrolyte in this manner allows a chemical polymerization reaction to be carried out in the vicinity of the dielectric oxide film layer. This reduces the floating of the conductive polymer in the reaction solution, thereby increasing the yield of the chemical polymerization reaction.

DETAILED DESCRIPTION OF THE INVENTION

Figure 1:
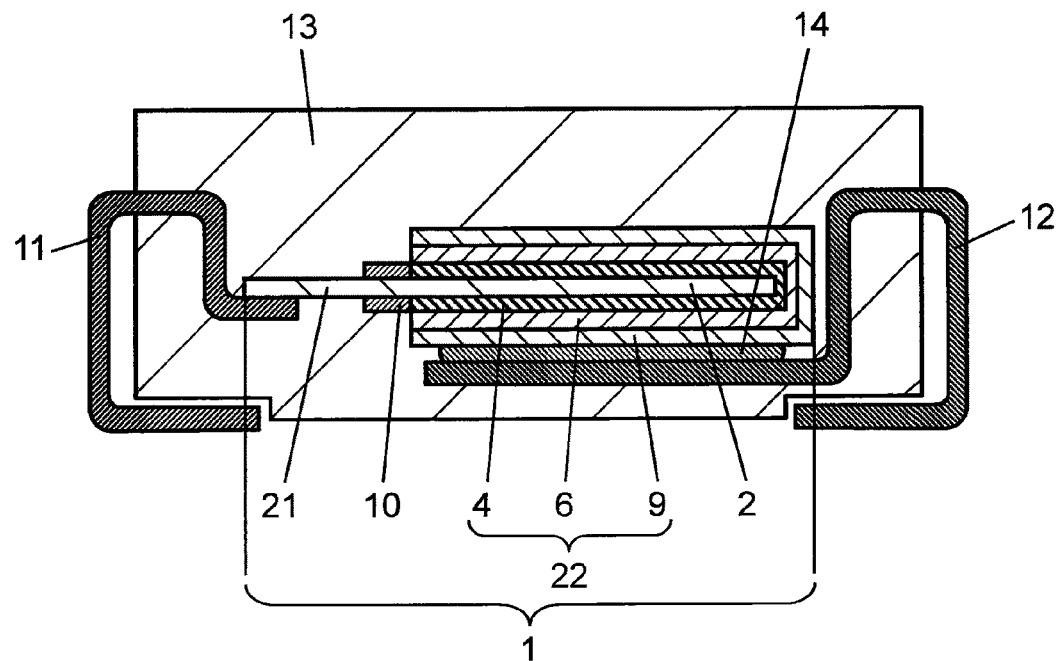
FIG. 1 is a sectional view of a solid electrolytic capacitor according to an embodiment of the present invention.
Figure 2:
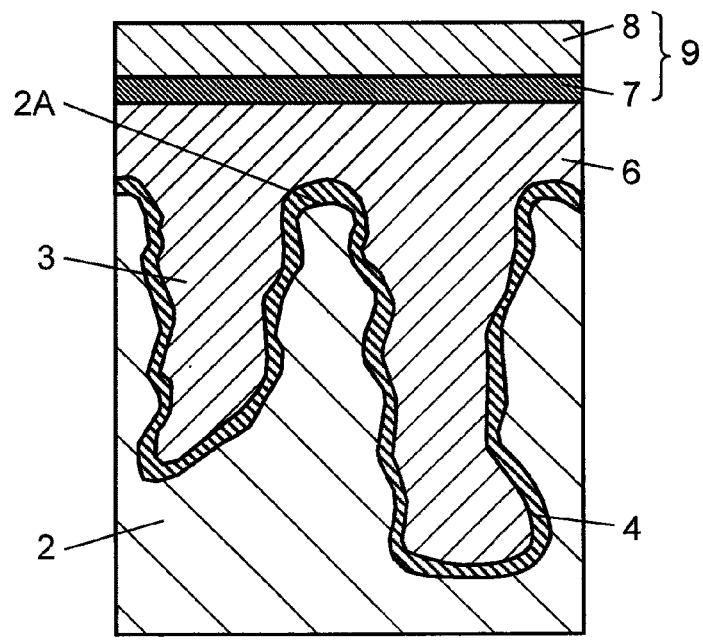
FIG. 2 is an enlarged sectional view of a capacitor element of the solid electrolytic capacitor of FIG. 1.

FIG. 1 is a sectional view of a solid electrolytic capacitor according to an embodiment of the present invention. FIG. 2 is a sectional view of an essential part of a capacitor element of the solid electrolytic capacitor. The solid electrolytic capacitor includes capacitor element 1, anode terminal 11, cathode terminal 12, and outer resin 13.

Capacitor element 1 includes anode body 2, dielectric oxide film layer 4, solid electrolyte 6, current collector layer 9, and separating layer 10. Anode body 2, which is the base of capacitor element 1, is made of valve metal foil such as aluminum, tantalum, niobium, or titanium. Alternatively, anode body 21 may be formed by connecting a valve metal lead member to a porous sintered body made by sintering valve metal powder.

Anode body 2 is provided with fine pores 3 formed by etching as shown in FIG. 2 to increase its surface area. Dielectric oxide film layer 4 is formed in fine pores 3 and on the surface of outer periphery 2A of anode body 2.

Electrically insulating separating layer 10 divides anode body 2 into anode section 21 and cathode section 22. Cathode section 22 is formed of dielectric oxide film layer 4, solid electrolyte 6, and current collector layer 9. Dielectric oxide film layer 4, conductive polymer solid electrolyte 6, and current collector layer 9 are stacked in this order on anode body 2.

In the present embodiment, solid electrolyte 6 made of conductive polymer is composed of poly(3,4-ethylenedioxythiophene) (hereinafter, PEDT). As shown in FIG. 2, current collector layer 9 is formed of carbon layer 7 and conductive layer 8 stacked in this order. Carbon layer 7 contains graphite, and conductive layer 8 contains conductive particles such as silver and nickel, and an epoxy or other resin.

Anode section 21 of capacitor element 1 is welded to anode terminal 11, and current collector layer 9 of cathode section 22 is connected to cathode terminal 12 with conductive adhesive 14.

Capacitor element 1 is covered with insulating outer resin 13 made of an epoxy or other resin. Anode terminal 11 and cathode terminal 12 are led out from outer resin 13 so as to be partially exposed on the mounting surface. Thus, a solid electrolytic capacitor is formed.

Figure 3:
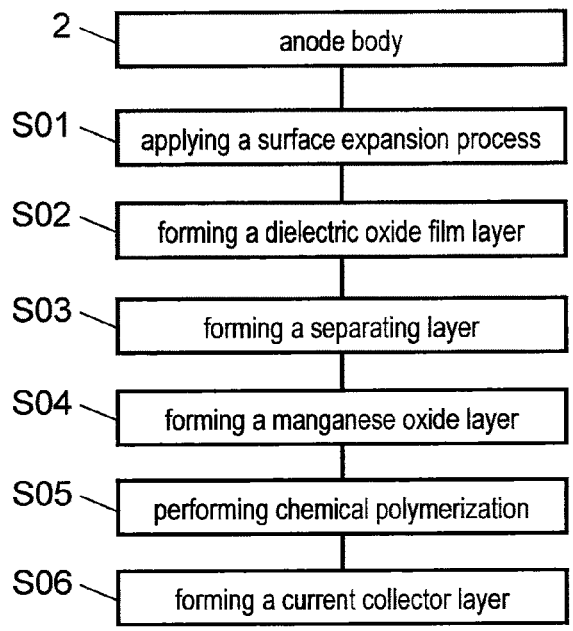
FIG. 3 shows a manufacturing procedure of the capacitor element of FIG. 1.
Figure 4:
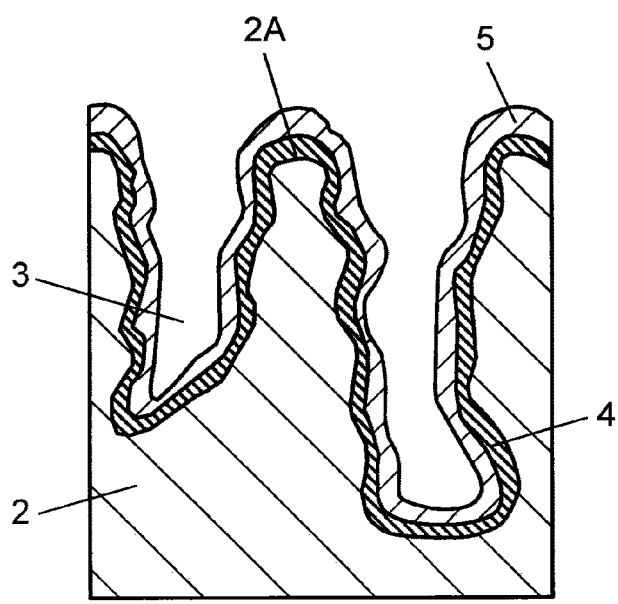
FIG. 4 is an enlarged sectional view of an anode body having a manganese oxide layer in the embodiment of the present invention.
Figure 5:
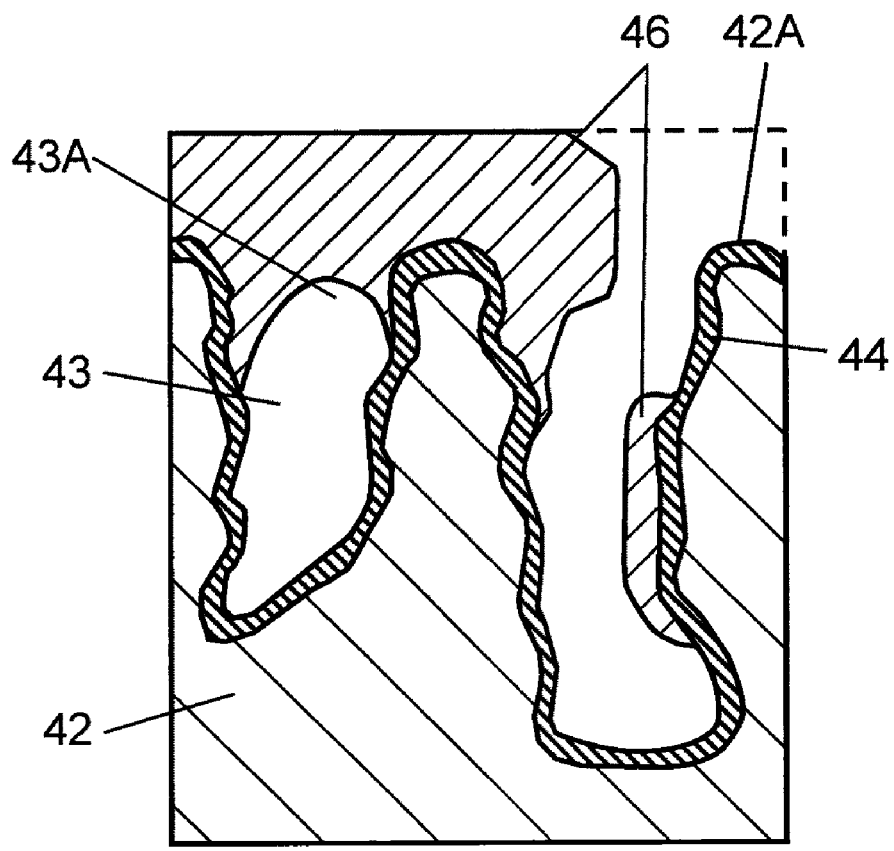
FIG. 5 is an enlarged sectional view of a conventional capacitor element.

Next, the method for manufacturing capacitor element 1 will be described in more detail as follows with reference also to FIGS. 3 and 4. FIG. 3 shows a manufacturing procedure of capacitor element 1, and FIG. 4 is an enlarged sectional view of anode body 2.

First, anode body 2 is subjected to a surface expansion process (S01), and then, dielectric oxide film layer 4 is formed thereon (S02). In the surface expansion process, anode body 2 made of valve metal foil is etched in an electrolytic solution so as to expand the surface area of the valve metal foil. In the formation of dielectric oxide film layer 4, anode body 2 is subjected to anodization in an aqueous solution so as to form dielectric oxide film layer 4 on the surface of anode body 2.

Next, separating layer 10 is formed (S03). Separating layer 10 may be formed, instead of after the formation of dielectric oxide film layer 4, before the surface expansion process (S01) or before the formation of dielectric oxide film layer 4 (S02). Separating layer 10 is formed by making the surface of anode body 2 either coated with insulating resin such as a polyimide resin or pasted with an insulating resin film.

Next, manganese oxide layer 5 is formed (S04), and then chemical polymerization (S05) is performed to form PEDT as solid electrolyte 6 on dielectric oxide film layer 4.

In the formation of the manganese oxide layer 5, an aqueous manganese nitrate solution is applied and left on the surface of dielectric oxide film layer 4, and then manganese nitrate is thermally decomposed in a humid high-temperature atmosphere. As a result, manganese oxide layer 5 is formed as a thin film on the surface of dielectric oxide film layer 4 as shown in FIG. 4.

Manganese oxide layer 5 contains at least one of manganese dioxide and dimanganese trioxide and is formed in fine pores 3 of anode body 2 and on the surface of outer periphery 2A of anode body 2.

In the formation of the manganese oxide layer 5, the thermal decomposition is preferably performed at a humidity of 40 vol % or more. The humidity condition can increase a capacitance induced by solid electrolyte 6, and hence, can reduce the ESR. The term "humidity" is defined as the ratio of water vapor to the atmosphere which is a mixture of air and water vapor.

As the humidity during the thermal decomposition of the aqueous manganese nitrate solution is higher, the dimanganese trioxide component increases. This can be verified by examining the abundance of dimanganese trioxide in manganese oxide layer 5 by X-ray diffraction. When the humidity during the formation of manganese oxide layer 5 is 40 vol % or more, the manganese oxide has a relatively smaller particle size than in the case where the humidity is less than 20 vol %, making manganese oxide layer 5 have a uniform thickness. On the other hand, as the humidity decreases, the manganese dioxide component increases. When the humidity is 20 vol % or less, manganese dioxide becomes the main component, and the manganese oxide has a relatively large particle size, making manganese oxide layer 5 have a non-uniform thickness.

Both dimanganese trioxide and manganese dioxide in manganese oxide layer 5 function as oxidizing agents for chemical polymerization reaction; however, the chemical polymerization reaction of 3,4-ethylenedioxythiophene (hereinafter, EDT) proceeds at different speeds depending on the ratio of the two oxidizing agents. When the humidity during the thermal decomposition is 40 vol % or more, the large amounts of dimanganese trioxide check the rapid progress of the chemical polymerization reaction, and in combination with the uniform thickness of manganese oxide layer 5, the degree of polymerization of PEDT is increased. This allows PEDT solid electrolyte 6 to be formed finely on the surface of dielectric oxide film layer 4. As a result, the solid electrolytic capacitor has high capacitance and low ESR.

The humidity during the thermal decomposition is preferably 90 vol % or less. Within this humidity range, a humid atmosphere can be easily controlled. The temperature during the thermal decomposition is preferably 200° C. to 350° C.

The manganese nitrate in the aqueous manganese nitrate solution preferably has a concentration of 50 wt % or less (excluding 0 wt %). Within the concentration in this range, the coverage of manganese oxide layer 5 on the surface of dielectric oxide film layer 4 can be easily controlled, allowing the solid electrolytic capacitors to have small variations in capacitance.

The coverage of manganese oxide layer 5 is preferably in the range of 5 to 20 μg/mm². When the coverage is less than 5 μg/mm², the amount of solid electrolyte 6 is not sufficient, and when it exceeds 20 μg/mm², the chemical polymerization reaction proceeds so fast that the PEDT may clog the fine pores, making the capacitance slightly small.

In the chemical polymerization, capacitor element 1 having manganese oxide layer 5 as an oxidizing agent is dipped in a reaction solution to cause a chemical polymerization reaction, and hence, to generate PEDT.

In this chemical polymerization reaction, chemical reactions (1) and (2) shown below occur at the same time. In the chemical reaction (1), the manganese dioxide and the dimanganese trioxide in manganese oxide layer 5 are reduced to divalent manganese ions in the acid reaction solution and dissolved therein. In the chemical reaction (2), the EDT is oxidized to PEDT.

$$MnO_2 + 4H^+ + 2e^- \rightleftharpoons Mn^{2+} + 2H_2O \qquad (1)$$

$$\left.\begin{array}{l} 2EDT \rightarrow 2EDT^+ + 2e^- \\ 2EDT^+ \rightarrow PEDT + 2H^+ \end{array}\right\} \qquad (2)$$

This chemical polymerization reaction occurs in the vicinity of the interface between the surface of manganese oxide layer 5 and the reaction solution, and the PEDT generated in the chemical polymerization reaction is formed on the surface of dielectric oxide film layer 4.

In the reaction, manganese oxide layer 5 is consumed and disappears from the surface of dielectric oxide film layer 4. Alternatively, instead of being all consumed, manganese oxide layer 5 can be left like discrete islands or stripes on the surface of dielectric oxide film layer 4.

Forming manganese oxide layer 5 on the surface of dielectric oxide film layer 4 and using it as an oxidizing agent for the chemical polymerization reaction allows the chemical polymerization reaction to take place in the vicinity of dielectric oxide film layer 4. This reduces the floating of the PEDT in the reaction solution, thereby increasing the yield of the chemical polymerization reaction.

The reaction solution contains EDT, an aromatic sulfonic acid, a polyhydric alcohol, and a solvent. The solvent is a mixed solvent of water and monohydric alcohol. The EDT and the aromatic sulfonic acid are dissolved in the solvent, and the polyhydric alcohol content is 10 wt % or less (excluding 0 wt %). The polyhydric alcohol can be, for example, ethylene glycol.

The reaction solution prevents the chemical polymerization reaction for generating the PEDT from slowing down or stopping halfway, thereby allowing PEDT solid electrolyte 6 to be stably formed. The reaction solution also reduces the floating or precipitating of the chemical polymerization products of EDT in the reaction solution, thereby increasing the yield of the chemical polymerization reaction. As a result, the PEDT as a conductive polymer formed on dielectric oxide film layer 4 has small variations in thickness when a plurality of capacitor elements 1 are produced. This significantly increases the production yield of solid electrolyte 6.

The chemical polymerization is carried out at a high speed at normal temperature, thereby increasing the productivity of chemical polymerization.

The EDT does not dissolve in the ethylene glycol or water. When the ethylene glycol content of the reaction solution is more than 10 wt %, it is impossible for the chemical polymerization reaction to proceed stably, thereby causing chemical polymerization products having a low degree of polymerization such as EDT oligomers to float, or the PEDT to be precipitated instead of being formed on dielectric oxide film layer 4.

Meanwhile, the reaction solution does not contain an oxidizing agent that oxidizes the EDT in the chemical polymerization reaction, such as ferric salt, persulfate, permanganate, or hydrogen peroxide.

The monohydric alcohol in the solvent of the reaction solution is used to dissolve the EDT in the reaction solution. The monohydric alcohol can be, for example, methanol, ethanol, or isopropyl alcohol. Among them, isopropyl alcohol is preferable because its low susceptibility to evaporation can keep the composition variation of the solvent of the reaction solution small and the chemical polymerization reaction stable. The monohydric alcohol content is adjusted by the EDT content to be dissolved.

Thus, in the chemical polymerization, EDT is used by being dissolved in the reaction solution. This allows the EDT to permeate fine pores 3 of anode body 2 and to be chemically polymerized with manganese oxide layer 5 in fine pores 3, thereby forming PEDT in fine pores 3.

The water in the solvent of the reaction solution is used to dissolve the aromatic sulfonic acid. When the aromatic sulfonic acid is dissolved, the reaction solution becomes an acid aqueous solution, thereby improving the oxidizing power of manganese oxide layer 5 as an oxidizing agent. As a result, the chemical polymerization to form PEDT proceeds stably.

The EDT content of the reaction solution is preferably 0.3 wt % or more and 2.0 wt % or less. Within this content range, the chemical polymerization reaction has a high yield, allowing stable formation of solid electrolyte 6.

The aromatic sulfonic acid in the reaction solution is incorporated as a dopant into the PEDT. The aromatic sulfonic acid preferably has at least one of a hydroxyl group and a carboxyl group on the aromatic ring so as to promote the chemical polymerization.

Specific examples of the aromatic sulfonic acid include toluenesulfonic acid, xylene sulfonic acid, cumene sulfonic acid, dodecylbenzenesulfonic acid, hydroxybenzenesulfonic acid, nitrobenzenesulfonic acid, sulfosalicylic acid, sulfophthalic acid, sulfoisophthalic acid, naphthalenesulfonic acid, naphthalenedisulfonic acid, alkylnaphthalenesulfonic acid, polyalkylnaphthalene sulfonic acid, anthraquinone sulfonic acid, anthraquinone disulfonic acid, biphenyl sulfonic acid, and derivatives thereof. These aromatic sulfonic acids and their derivatives can be used either alone or in combination.

Among them, sulfosalicylic acid is preferable because it can increase the film thickness of PEDT solid electrolyte 6 formed on outer periphery 2A of anode body 2. This improves the induction of capacitance by solid electrolyte 6 and reduces the ESR of solid electrolytic capacitor. Using sulfosalicylic acid also reduces deterioration of leakage current characteristics when dielectric oxide film layer 4 is damaged by external stresses.

Here, the mechanism of how the chemical polymerization reaction stably proceeds in the present embodiment is considered as follows. When the reaction solution contains no ethylene glycol, as the chemical polymerization reaction proceeds, the concentration of the divalent manganese ions increases in the vicinity of the chemical polymerization reaction region. This causes the chemical reaction (1) to stop, and hence, the chemical reaction (2) does not to occur. When the reaction solution contains ethylene glycol as in the present embodiment, on the other hand, the ethylene glycol is coordinated to the divalent manganese ions so as to continue the chemical reaction (1) and to stably proceed the chemical reaction (2).

Solid electrolyte 6 may alternatively be prepared by further providing a conductive polymer such as polypyrrole, polythiophene, or aniline on the surface of the PEDT conductive polymer using the well-known electrolytic polymerization method or the chemical polymerization method.

Next, current collector layer 9 is formed on the surface of solid electrolyte 6 (S06). In the formation of current collector layer 9 (S06), first, an aqueous carbon dispersion containing graphite is applied to the surface of solid electrolyte 6 and hardened to form carbon layer 7. Then, a resin paste containing conductive particles is applied on the surface of carbon layer 7 and hardened to form conductive layer 8, thus completing current collector layer 9.

After thus forming capacitor element 1, a lead frame (not shown) is connected to anode section 21 and cathode section 22, respectively, and then outer resin 13 is formed. The lead frame is cut and processed to form terminals 11 and 12, thereby completing the solid electrolytic capacitor.

In the connection of the lead frame, capacitor element 1 is connected to the lead frame; anode section 21 of capacitor element 1 is connected to anode terminal 11 of the lead frame and current collector layer 9 of capacitor element 1 is connected to cathode terminal 11 of the lead frame, respectively.

In the formation of outer resin 13, capacitor element 1 connected to the lead frame is sealed with outer resin 13 by molding.

In the formation of terminals 11 and 12, the parts of the lead frame that are exposed from outer resin 13 are cut, and the exposed parts are bent along the outer peripheral surface of outer resin 13 so as to form anode terminal 11 and cathode terminal 12.

The method for manufacturing a solid electrolytic capacitor according to the present embodiment is also applicable to a solid electrolytic capacitor in which a capacitor element includes anode and cathode bodies both made of valve metal foil and wound with a separator interposed therebetween, and solid electrolyte is formed.

In the above description, the monomer is EDT and the solvent contains monohydric alcohol capable of dissolving EDT; however the present invention is not limited to this example. The monomer can be other monomers to make conductive polymer, such as other thiophene derivatives and pyrrole. These materials can also be dissolved in monohydric alcohol. The solvent is not limited to a mixture of water and monohydric alcohol as long as it can dissolve aromatic sulfonic acid and the monomer. Specific examples of the solvent include hydrocarbons such as pentane, ethers such as tetrahydrofuran, esters such as ethyl formate, ketones such as acetone, alcohols such as methanol, and nitrogen compounds such as acetonitrile. The polyhydric alcohol is not limited to ethylene glycol as long as it is coordinated to manganese ions so as to remove them from solid electrolyte 6. Specific examples of the polyhydric alcohol include diethylene glycol, triethylene glycol, tetraethylene glycol, polyethylene glycol, glycerin, propylene glycol, polypropylene glycol, and butylene glycol. These polyhydric alcohols may be used alone or in combination. Furthermore, the ligand can be used other than polyhydric alcohol. For example, it is possible to use a chelating agent, which can be, for example, an amino-carbonate compound such as ethylenediaminetetraacetate (EDTA) or a salt thereof, gluconic acid, or citric acid. Since the reaction solution used in the present invention is acid, the chelating agent is preferably used in the form of acid.

In the above description, the reaction solution contains polyhydric alcohol from the beginning; however, the present invention is not limited to this example. It is alternatively possible to first prepare the reaction solution using the components other than polyhydric alcohol and then to add polyhydric alcohol thereto when chemical polymerization reaction is started. In other words, polyhydric alcohol capable of being coordinated to manganese ions released from manganese oxide layer 5 may be made to coexist with the chemical polymerization reaction. Therefore, when ethylene glycol is used as the polyhydric alcohol, the ethylene glycol content in the sum of the reaction solution and the ethylene glycol is preferably over 0% and not more than 10 wt %.

The present embodiment will be described in more detail as follows using specific examples. First, Sample A will be described as follows.

In Sample A, capacitor element 1 includes an aluminum foil as anode body 2 and PEDT as solid electrolyte 6 is formed thereon. Anode body 2 is prepared by subjecting 100 μm-thick aluminum foil of 99.99% purity to AC electrolytic etching as the surface expansion process. Then, anode body 2 is dipped in an aqueous ammonium dihydrogen phosphate solution at a concentration of 0.3 wt %, and subjected to a DC voltage of 6V for 20 minutes at a solution temperature of 70° C. As a result, dielectric oxide film layer 4 is formed on the surface of anode body 2.

Next, cathode section 22 of anode body 2 having dielectric oxide film layer 4 is dipped in an aqueous manganese nitrate solution to coat anode body 2 therewith. The aqueous manganese nitrate solution contains 45 wt % of manganese nitrate.

Then, anode body 2 is dried at a temperature of 100° C. or less so as to reduce the moisture content of the aqueous manganese nitrate solution coated on the outer surface of anode body 2 to an invisible extent. Anode body 2 is then subjected to thermal decomposition for ten minutes in a humid high-temperature atmosphere at a temperature of 300° C. and a humidity of 40 vol % so as to form manganese oxide layer 5.

Next, chemical polymerization is carried out using a reaction solution which is a mixed solution composed of 1 wt % of EDT, 13 wt % of sulfosalicylic acid, 5 wt % of ethylene glycol, and a mixed solvent of 66 wt % of pure water and 15 wt % of isopropyl alcohol.

Cathode section 22 of anode body 2 having manganese oxide layer 5 is dipped for 30 minutes in the reaction solution kept at 20 to 25° C. so as to carry out the chemical polymerization to form PEDT solid electrolyte 6. These series of operations are performed only once to form solid electrolyte 6.

Next, carbon layer 7 containing graphite, and conductive layer 8 containing silver particles and an epoxy resin are stacked in this order on the surface of solid electrolyte 6 so as to form current collector layer 9, thus completing capacitor element 1.

Then, anode section 21 of capacitor element 1 is laser-welded to anode terminal 11 of the copper alloy lead frame. Meanwhile, cathode section 22 of capacitor element 1 is coupled to cathode terminal 12 of the copper alloy lead frame using conductive adhesive 14 containing silver particles.

Next, capacitor element 1 is sealed with outer resin 13 made of epoxy resin by transfer molding. The parts of anode terminal 11 and cathode terminal 12 that are exposed from outer resin 13 are bent along outer resin 13 from the end surface toward the mounting surface. This results in the completion of a solid electrolytic capacitor with a rated voltage of 2V and a rated capacity of 34 μF.

Furthermore, Samples B to H and V to Z are manufactured under the following conditions. The following description of the manufacturing method will be focused on the features different from Sample A.

The following is a consideration of the effects of ethylene glycol, which is a polyhydric alcohol, and isopropyl alcohol, which is a monohydric alcohol used as a solvent, and the type of aromatic sulfonic acid. Samples B to D use aromatic sulfonic acids different in kind and amount from the one used in Sample A in the reaction solution, and the amount of pure water is adjusted to the aromatic sulfonic acid content.

In Sample B, the reaction solution is composed of 11 wt % of p-toluenesulfonic acid as an aromatic sulfonic acid, 1 wt % of EDT, 5 wt % of ethylene glycol, and a mixed solvent of 68 wt % of pure water and 15 wt % of isopropyl alcohol.

In Sample C, the reaction solution is composed of 7 wt % of naphthalenedisulfonic acid as an aromatic sulfonic acid, 1 wt % of EDT, 5 wt % of ethylene glycol, and a mixed solvent of 72 wt % of pure water and 15 wt % of isopropyl alcohol.

Thus, in Samples B and C, the contents of isopropyl alcohol, EDT, and ethylene glycol are the same as in Sample A.

In Sample D, the reaction solution contains 8 wt % of xylene sulfonic acid as an aromatic sulfonic acid, and 71 wt % of pure water. The contents of isopropyl alcohol, EDT, and ethylene glycol are the same as in Sample A.

In Samples V to Y, the reaction solutions do not contain ethylene glycol, which is used in Samples A to D, respectively, and instead contain more isopropyl alcohol. More specifically, in Sample V, the reaction solution is composed of 1 wt % of EDT, 13 wt % of sulfosalicylic acid, and a mixed solvent of 66 wt % of pure water and 20 wt % of isopropyl alcohol. In Samples W to Y, the reaction solutions do not contain ethylene glycol and instead contain 20 wt % of isopropyl alcohol as in Sample V, and contain the same amounts of pure water, EDT, and aromatic sulfonic acid as in Samples B to D, respectively.

In Sample Z, the reaction solution does not contain isopropyl alcohol, which is used in Sample A and instead contains ethylene glycol. More specifically, in Sample Z, the reaction solution is composed of 1 wt % of EDT, 13 wt % of sulfosalicylic acid, and a mixed solvent of 66 wt % of pure water and 20 wt % of ethylene glycol.

As a first evaluation item of the solid electrolytic capacitors of Samples A to D and V to Z, the production yield of solid electrolyte 6 is calculated. The term "the production yield" of solid electrolyte 6 means the ratio of non-defective units of solid electrolyte 6 to 100 of capacitor elements produced.

In the non-defective units of solid electrolyte 6, the PEDT conductive polymer has sufficient film thickness. More specifically, the PEDT coats the surface of outer periphery 2A of anode body 2 sufficiently so that dielectric oxide film layer 4 of cathode section 22 is not visually observed. In defective units of solid electrolyte 6, on the other hand, the PEDT has an insufficient film thickness, so that some parts of dielectric oxide film layer 4 of cathode section 22 are visually observed. Thus, non-defective units of solid electrolyte 6 are visually found.

The non-defective units of solid electrolyte 6 are checked for film thickness ratio. The film thickness indicates the thickness of the PEDT formed on the surface of outer periphery 2A of anode body 2 of cathode section 22. The film thickness ratio is the ratio of the average value of the film thickness in each Sample to the average value of the film thickness in Sample V.

The non-defective units of solid electrolyte 6 are further checked for capacitance when the solid electrolytic capacitor is operated at a measuring frequency of 120 Hz, and also checked for ESR when the solid electrolytic capacitor is operated at a measuring frequency of 100 kHz, and their average values are calculated. The average value of the capacitance is shown as the ratio of the average value of the capacitance in each Sample to the average value of the capacitance in Sample V. In Sample Z, it is impossible to form solid electrolyte 6 in cathode section 22, and therefore, film thickness, capacitance, and ESR are not measured. The measurement results are shown in Table 1 below.

TABLE 1

|   | production yield of solid electrolyte (%) | film thickness ratio of PEDT | capacitance ratio | average value of ESR (mΩ) |
|---|---|---|---|---|
| A | 100 | 1.14 | 1.08 | 12.0 |
| B | 100 | 1.11 | 1.03 | 22.5 |
| C | 100 | 0.96 | 1.06 | 14.9 |
| D | 100 | 1.00 | 1.02 | 21.0 |
| V | 74  | 1.00 | 1.00 | 12.5 |
| W | 41  | 0.98 | 1.00 | 21.5 |
| X | 50  | 1.03 | 0.97 | 17.8 |
| Y | 32  | 0.87 | 1.02 | 14.2 |
| Z | 0   | —    | —    | —    |

As shown in Table 1, the production yield of the solid electrolyte is 100% in Samples A to D, and 74%, 41%, 50%, 32%, and 0% in Samples V to Z, respectively. Thus, containing ethylene glycol in the reaction solution can substantially increase the production yield of the solid electrolyte as compared with the case using a reaction solution not containing ethylene glycol.

In Sample Z where the reaction solution does not contain isopropyl alcohol and instead contains the mixed solvent of ethylene glycol and water, EDT is not dissolved in the reaction solution. As a result, there is no formation of PEDT on dielectric oxide film layer 4.

In Sample A, sulfosalicylic acid is used as the aromatic sulfonic acid. In Samples B to D, on the other hand, the aromatic sulfonic acid is p-toluenesulfonic acid, naphthalenedisulfonic acid, and xylene sulfonic acid, respectively. Sample A has a larger PEDT film thickness, a larger capacitance, and a smaller ESR than Samples B to D. As a result, it is preferable to use sulfosalicylic acid.

The following is a consideration of the ethylene glycol content. In Samples E and F, the ethylene glycol content of the reaction solution is different from in Sample A, and the amount of pure water is adjusted to the ethylene glycol content.

In Sample E, the ethylene glycol content of the reaction solution is 1 wt %. More specifically, in Sample E, the reaction solution is a mixed solution composed of 1 wt % of ethylene glycol, 1 wt % of EDT, 13 wt % of sulfosalicylic acid, and a mixed solvent of 70 wt % of pure water and 15 wt % of isopropyl alcohol.

In Sample F, the ethylene glycol content of the reaction solution is 10 wt %. More specifically, in Sample F, the reaction solution is composed of 10 wt % of ethylene glycol, 61 wt % of pure water, and the same percentages of isopropyl alcohol, EDT, and sulfosalicylic acid as in Samples A and E.

The solid electrolytic capacitors of Samples E and F produced under the above-described conditions are measured for the production yield of solid electrolyte 6. In addition, after the chemical polymerization reaction, the states of the reaction solutions are visually observed. A reaction solution in a good state means that the reaction solution is uniform without suspended solids or sediments of chemical polymerization products. Similarly, the reaction solutions of Samples A, V, and Z are observed. The results are shown in Table 2 below.

TABLE 2

|   | production yield of solid electrolyte (%) | state of reaction solution after chemical polymerization reaction |
|---|---|---|
| A | 100 | good |
| E | 100 | good |

TABLE 2-continued

| | production yield of solid electrolyte (%) | state of reaction solution after chemical polymerization reaction |
|---|---|---|
| F | 100 | good |
| V | 74 | suspended solids |
| Z | 0 | suspended solids and sediments |

As shown in Table 2, the production yield of solid electrolyte 6 is 100% in Samples E and F as in Sample A. This means that having 1 wt % to 10 wt % of ethylene glycol in the reaction solution substantially increases the production yield of solid electrolyte 6. In Samples A, E, and F, the reaction solution is in a good state after chemical polymerization reaction, indicating that the chemical polymerization reaction proceeds stably enough to increase the yield. In Samples V and Z, on the other hand, the reaction solution contains products generated during the chemical polymerization reaction and the PEDT sediments.

As described above, containing 10 wt % or less (excluding 0%) of ethylene glycol in the reaction solution can increase the yield of chemical polymerization reaction so as to stably form solid electrolyte 6, thereby substantially increasing the production yield of solid electrolyte 6.

The following is a consideration of the humidity of the atmosphere during the thermal decomposition. Samples G and H are produced in the same manner as Sample A except for the humidity of the atmosphere during the thermal decomposition. In Samples G and H, the atmosphere during the thermal decomposition has a temperature of 300° C. and a humidity of 20 vol % and 85 vol %, respectively.

The solid electrolytic capacitors of Samples G and H are checked for capacitance at a measuring frequency of 120 Hz, and also checked for ESR at a measuring frequency of 100 kHz, and their average values are calculated. The average value of the capacitance is expressed as its ratio to the average value of the capacitance of Sample V. The results are shown in Table 3 below.

TABLE 3

| | capacitance ratio | average value of ESR (mΩ) |
|---|---|---|
| A | 1.08 | 12.0 |
| G | 1.00 | 13.1 |
| H | 1.09 | 10.8 |
| V | 1.00 | 12.5 |

A comparison between Samples A, G, H, and V shows that Samples A and H have larger capacitance ratios and smaller ESRs than Samples G and V. As a result, the humidity of the atmosphere during the thermal decomposition is preferably 40 vol % or more.

The following is a consideration of the coverage of manganese oxide layer 5. The solid electrolytic capacitors of Samples J1 to J6 are manufactured in the same manner as in Sample A except for the following point. The coverage of manganese oxide layer 5 on dielectric oxide film layer 4 is made 1, 5, 10, 15, 20, and 25 µg/mm$^2$, respectively, in Samples J1 to J6 by changing the concentration of the aqueous manganese nitrate solution. The coverage of manganese oxide layer 5 in Sample A is 8 µg/mm$^2$.

The solid electrolytic capacitors of Samples J1 to J6 are checked for capacitance at a measuring frequency of 120 Hz and also checked for ESR at a measuring frequency of 100 kHz, and their average values are calculated. The average value of the capacitance is expresses as its ratio to the average value of the capacitance of Sample V. The results are shown in Table 4 below.

TABLE 4

| | coverage of manganese oxide layer (µg/mm$^2$) | capacitance ratio | average value of ESR (mΩ) |
|---|---|---|---|
| J1 | 1 | 0.87 | 15.1 |
| J2 | 5 | 1.02 | 10.8 |
| J3 | 10 | 1.05 | 10.2 |
| J4 | 15 | 1.06 | 10.3 |
| J5 | 20 | 1.04 | 10.5 |
| J6 | 25 | 0.96 | 13.2 |

As shown in Table 4, when the coverage of manganese oxide layer 5 is less than 5 µg/mm$^2$ or over 20 µg/mm$^2$, the capacitance ratio is larger and the ESR is smaller than in Sample V. Thus, the amount of manganese oxide layer 5 is preferably 5 µg/mm$^2$ or more and 20 µg/mm$^2$ or less.

As described hereinbefore, the method for manufacturing a solid electrolytic capacitor according to the present invention provides high yield of the chemical polymerization reaction, thereby stably forming the solid electrolyte. Therefore, this method is useful as a method for manufacturing a solid electrolytic capacitor with conductive polymer solid electrolyte.

What is claimed is:

1. A method for manufacturing a solid electrolytic capacitor, the method comprising:
   A) forming a capacitor element, including:
      A1) forming a manganese oxide layer on a surface of a dielectric oxide film layer in a cathode section of an anode body, the anode body being divided into an anode section and the cathode section;
      A2) forming conductive polymer as a solid electrolyte on the dielectric oxide film layer by chemically polymerizing a reaction solution containing a monomer, aromatic sulfonic acid, and a solvent using the manganese oxide layer as an oxidizing agent; and
      A3) forming a current collector layer on the solid electrolyte;
   B) connecting an anode terminal to the anode section of the anode body and connecting a cathode terminal to the current collector layer; and
   C) coating the capacitor element with an outer resin in such a manner that the anode terminal and the cathode terminal are partially exposed from the outer resin, wherein
   in the A2), polyhydric alcohol capable of being coordinated to manganese ions released from the manganese oxide layer is made to coexist with a chemical polymerization reaction.

2. The method for manufacturing a solid electrolytic capacitor according to claim 1, wherein
   the solvent is a mixed solvent of water and monohydric alcohol.

3. The method for manufacturing a solid electrolytic capacitor according to claim 2, wherein
   the monohydric alcohol is isopropyl alcohol.

4. The method for manufacturing a solid electrolytic capacitor according to claim 1, wherein
   the polyhydric alcohol is ethylene glycol, and an ethylene glycol content in a sum of the reaction solution and the ethylene glycol is over 0% and not more than 10 wt %.

5. The method for manufacturing a solid electrolytic capacitor according to claim 1, wherein
the aromatic sulfonic acid is sulfosalicylic acid.

6. The method for manufacturing a solid electrolytic capacitor according to claim 1, wherein
the A1) includes:
A11) applying an aqueous manganese nitrate solution to the surface of the dielectric oxide film layer;
A12) drying the aqueous manganese nitrate solution; and
A13) thermally decomposing dried manganese nitrate in a humid atmosphere having a humidity of not less than 40 vol %.

7. The method for manufacturing a solid electrolytic capacitor according to claim 1, wherein
the monomer is 3,4-ethylenedioxythiophene.

* * * * *